United States Patent [19]

Yagi

[11] Patent Number: 5,582,475
[45] Date of Patent: Dec. 10, 1996

[54] LAMP MOUNTING APPARATUS FOR A VEHICLE

[75] Inventor: Yoshihiro Yagi, Shizuoka, Japan

[73] Assignee: Koito Manufacturing Co., Ltd., Tokyo, Japan

[21] Appl. No.: 275,419

[22] Filed: Jul. 15, 1994

[30]  Foreign Application Priority Data

Jul. 22, 1993 [JP] Japan ................. 5-044347 U

[51] Int. Cl.⁶ ..................................... B60Q 1/02
[52] U.S. Cl. ..................... 362/80; 362/369; 362/457
[58] Field of Search ................. 362/61, 80, 368, 362/369, 382, 457; 411/44, 41; 248/222.1

[56]  References Cited

U.S. PATENT DOCUMENTS 2,062,993  12/1936  Haines ................................ 362/83
3,104,831   9/1963  Scowen ............................... 362/369
3,262,168   7/1966  Overhoff .............................. 411/44
4,343,031   8/1982  Liebegott ............................ 362/80
4,831,503   5/1989  Desantis et al. ...................... 362/80
5,240,762   5/1995  Lewis ................................. 362/80

Primary Examiner—Denise L. Gromada
Assistant Examiner—Y. Quach
Attorney, Agent, or Firm—Sughrue, Mion, Zinn, Macpeak & Seas

[57]  ABSTRACT

A pedestal piece 20 is integrally projected from the back face of a lamp mounting apparatus body 1, and a pin 2 is integrally projected from the center of the rear face of the pedestal piece 20. The head 2B of the pin 2 is pressingly fitted into a fastener attached to a vehicle body, thereby positioning and fastening the lamp mounting apparatus body 1 to the vehicle body.

12 Claims, 2 Drawing Sheets

FIG. 1 PRIOR ART
FIG. 2 PRIOR ART
FIG. 3
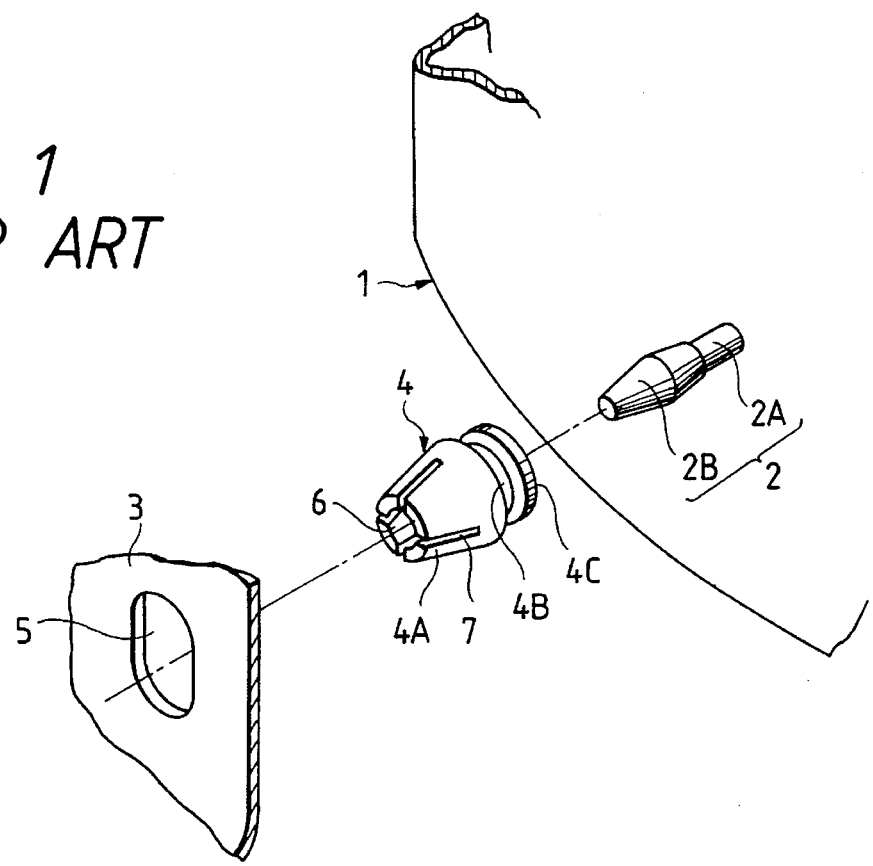
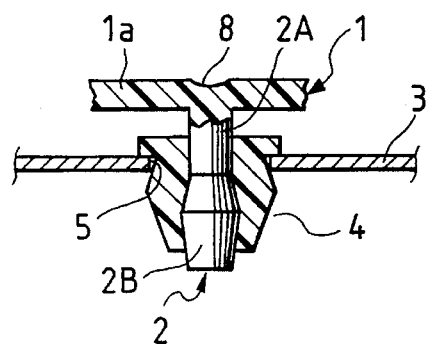
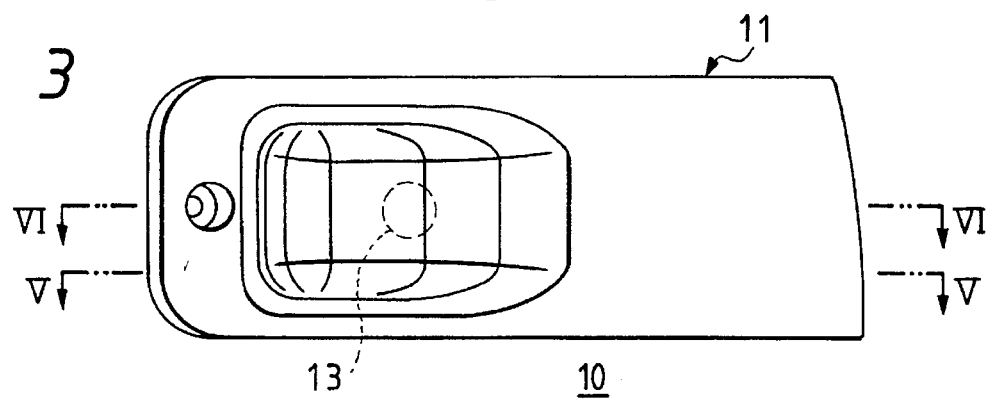

LAMP MOUNTING APPARATUS FOR A VEHICLE

The invention relates to a lamp mounting apparatus for a vehicle by which a lamp body is positioned and fastened to a vehicle body by using a pin and a fastener.

Conventionally, in various lamps for a vehicle, such as a headlamp, and reversing light lamps which are to be mounted on an automobile, the body of each lamp is positioned appropriately with respect to vehicle body by using a pin, a fastener, etc., and then firmly fastened to the vehicle body by stud bolts, tapping screws or the like.

FIGS. 1 and 2 are exploded perspective and section views which show a conventional mounting apparatus for positioning and fastening a lamp body by using a pin and a fastener, respectively. In the figures, 1 designates a lamp body, and 2 designates a pin which integrally projects from an adequate portion of the back surface of the lamp body 1. The pin 2 is provided with a small-diameter base 2A, and a head 2B which is integrally formed at the front end of the small-diameter base 2A and has a barrel-like (abacus bead-like) shape. The reference numeral 3 designates a vehicle body, and 4 designates a fastener which is pressingly fitted into a fitting hole 5 of the vehicle body 3. The fastener 4 is made of a resin so as to have a cylindrical shape, and consists of the fastener body 4A having a substantially abacus bead-like shape, a neck portion 4B which is integrally formed at a base portion of the fastener body 4A, and a large-diameter portion 4C having a disk-like shape. A pin insertion hole 6 into which the head 2B of the pin 2 is press-fitted is formed so as to pass through the center portion of the fastener. Slots 7 are formed in the axial direction in the peripheral surface of the front end portion of the fastener body 4A. The fastener 4 is inserted into the fitting hole 5 so that the neck portion 4B positions in the hole, thereby preventing the fastener from falling off from the vehicle body 3.

However, such a prior art lamp apparatus for a vehicle suffers from the following problems. Since the distance between the lamp body 1 and the vehicle body 3 is long, the pin 2 must be made long also. This causes the pin to be easily broken by a shock or the like. When the pin 2 is broken, furthermore, there arises a possibility that an inner surface 1a which constitutes a reflecting surface of the lamp body 1 may crack. In addition, there is another problem in that in a process of molding the lamp body 1 a sink spot 8 may easily be produced at a portion of the inner surface which corresponds to the pin 2.

SUMMARY OF THE INVENTION

The present invention was conceived in view of the foregoing problems accompanying the conventional art. Accordingly, it is an object of the invention to provide a lamp mounting apparatus for a vehicular lamp capable of shortening a pin, so that a breakage of the pin is prevented from occurring and that, even when the pin is broken, the inner surface of the lamp body is not affected by the breakage of the pin, and the inner surface is less affected by a sink spot produced during a molding process.

The above and other objects can be achieved by a provision of a lamp mounting apparatus which, according to the present invention, includes a pin integrally projecting from a back surface of a lamp body and which is inserted into a fastener disposed on a vehicle body side. The lamp mounting apparatus further includes a pedestal piece formed integrally on the back surface of the lamp body and which opens at a center portion, and the pin integrally projecting from the pedestal piece.

According to the invention, the pedestal piece can reduce the length of the pin so that the pin is hardly broken. Since the pedestal piece opens at its center portion, a sink spot is hardly produced during a process of molding the lamp body.

BRIEF DESCRIPTION OF THE DRAWINGS

FIG. 1 is an exploded perspective view showing a conventional lamp mounting apparatus by using a pin and a fastener;

FIG. 2 is a section view showing a state in which the pin is pressingly inserted into the fastener;

FIG. 3 is a front view of the lamp;

DESCRIPTION OF THE PREFERRED EMBODIMENTS

Hereinafter, the present invention will now be described in detail with reference to accompanying drawings.

Figure 4:
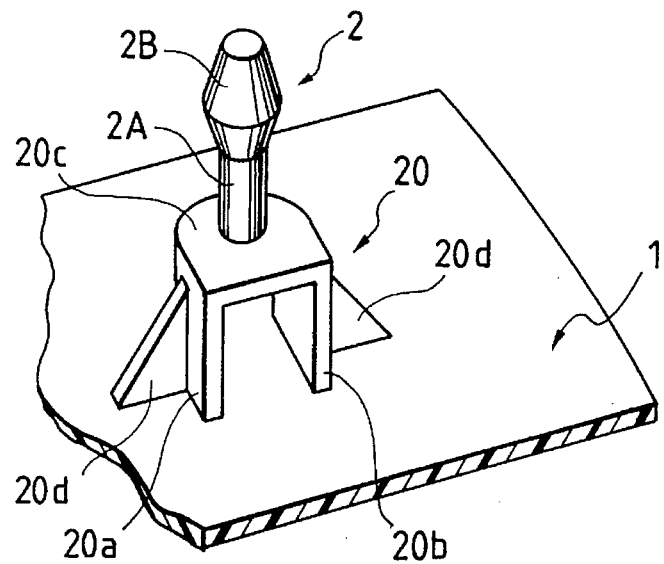
FIG. 4 is a perspective view showing the main portion of an embodiment in which the lamp mounting apparatus of the invention is applied to a turn signal lamp.
Figure 5:
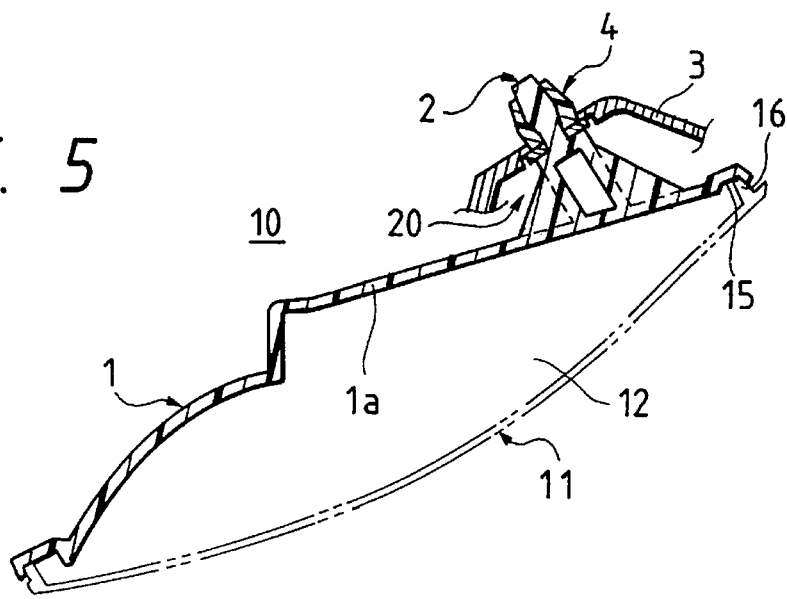
FIG. 5 is a section view taken along line V—V of FIG. 3.
Figure 6:
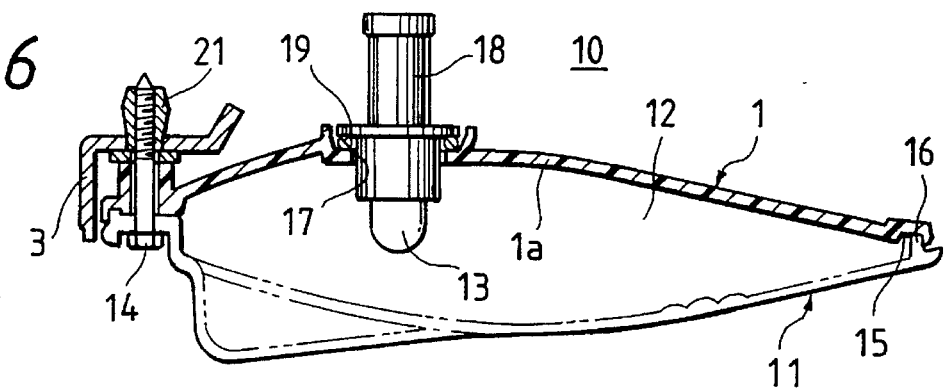
FIG. 6 is a section view taken along line VI—VI of FIG. 3.

FIG. 3 is a front view of the lamp, FIG. 4 is a perspective view showing the main portion of one embodiment in which the lamp mounting apparatus of the invention is applied to a turn signal lamp, FIG. 5 is a section view taken along line V—V of FIG. 3, and FIG. 6 is a section view taken along line VI—VI of FIG. 3. In the figures, the same components as those of FIGS. 1 and 2 are designated by the same reference numerals.

According to the embodiment of the invention, a turn signal lamp 10 comprises a lamp body 1 which is integrally formed by an injection molding a resin having excellent insulating properties, such as polypropylene, a front lens 11 which airtightly closes a front opening of the lamp body 1, and a turn signal bulb 13 disposed in a lamp chamber 12 which is defined by the lamp body 1 and the front lens 11. The lamp body 1 positions and fastens to a predetermined appropriate position of a vehicle body 3 by a pin 2, a fastener 4, and a tapping screw 14.

An inner surface 1a of the lamp body 1 consists of a rectangular frame member which is laterally elongated, and a reflecting surface formed by conducting a vapor deposition of aluminum or the like on the inner surface 1a. A groove 15 is formed around the entire periphery of a front surface of the lamp body 1. A frame-like fixing leg 16 which projects from the periphery of the back surface of the front lens 11 is inserted into the groove 15 of the lamp body 1, and fastened thereto by an ultrasonic welding, an adhesive or the like.

A bulb mounting hole 17 is formed at a left-hand portion of the back surface of the lamp body 1. A socket bulb 18 to which the bulb 13 is attached is fitted from the rear side into the bulb mounting hole 17 through an O-ring 19, and fastened thereto. The tapping screw 14 (or a plurality of such screws) is screwed into the vehicle body 3 to secure the left end portions of the front lens 11 and the lamp body 1 to the vehicle body. Alternatively, a stud bolt or bolts could be used for fastening the lamp body to the vehicle body.

A pedestal piece 20 is integrally formed at a portion of the back face of the lamp body 1 which portion is opposite to the end portion where the tapping screw 14 is disposed. The pedestal piece 20 projects in an oblique rearward direction. As shown in FIG. 4, the pedestal piece 20 is concave at its center portion so as to form a U-like shape in a plan view (or in a side view), and comprises a pair of side wall plates 20a and 20b which are opposed to each other in the lateral direction (or in the vertical direction), and a rear surface plate 20c which connects the front ends of the side wall plates 20a and 20b with each other. A reinforcing rib 20d is integrally formed on the outer side surface of each of the side wall plates 20a and 20b. The pin 2 integrally projects from the center of the surface of the rear surface plate 20c. The head 2B of the pin 2 is pressingly fitted into the fastener 4 attached to the vehicle body 3. The thickness of side wall plates 20a and 20b, the rear surface plate 20c, and the reinforcing ribs 20d is designed so as to be equal in thickness to the lamp body 1.

The pin 2 and the fastener 4 are configured in the same manner as those of the prior art apparatus shown in FIGS. 1 and 2, and hence their detailed description is omitted. In FIG. 6, reference numeral 21 depicts a nut.

In the thus configured turn signal lamp 10, since the pedestal piece 20 is formed on the back face of the lamp body 1 and the pin 2 projects from the rear surface of the pedestal piece 20, the length of the pin 2 can be reduced by the projecting dimension of the pedestal piece 20. Therefore, the possibility of breaking the pin 2 by a shock or the like is reduced. Even when the pin 2 is broken, the inner surface 1a of the lamp body 1 is prevented from cracking unless the pedestal piece 20 is broken. Since the pedestal piece 20 is concave in shape, the inner surface 1a is less affected by a sink spot, etc. produced during a process of molding the lamp body 1.

This can be explained as follows: A sink spot may be produced at a portion of the inner face of the body which corresponds to the side wall plate 20a or 20b. When the distance between the back surface of the lamp body 1 and the front end of the pin 2 is set so as to be equal to that of the conventional apparatus of FIGS. 1 and 2, however, the height of the side wall plates 20a and 20b is smaller than the projecting dimension of the pin of the conventional apparatus, and the thickness of the side wall plates is smaller than the diameter of the small-diameter base 2A. Therefore, the possibility of producing a sink spot is reduced, so that the inner face of the body is less affected by a sink spot.

In the above embodiment, the invention is applied to a turn signal lamp. The invention is not restricted to the embodiment however. It is a matter of course that the invention can be applied a headlamp, a reversing light lamp, and the like.

As is apparent from the above description, the lamp mounting apparatus for a vehicular lamp according to the present invention is configured so that a pedestal piece which is concave at a center portion projects from the back surface of the lamp body, a pin projects from the rear surface of the pedestal piece, and the pin is press-fitted into a fastener attached to a vehicle body. Consequently, the length of the pin can be reduced by the projecting dimension of the pedestal piece, and hence the pin is prevented from being broken. Even when the pin is broken, the inner face of the lamp body is prevented from cracking unless the pedestal piece is broken.

Further, the possibility that a sink spot is produced during a process of molding the lamp body is small. Moreover, since the pin integrally projects from the lamp body, the number of parts and that of steps of assembling the lamp can be suppressed so that the lamp is manufactured at a lower cost.

What is claimed is:

1. A lamp mounting apparatus for a vehicular lamp emitting light in a forward direction, comprising:
    a fastener disposed on a vehicle body;
    a pedestal piece formed on a rear surface of a lamp body of the vehicular lamp; and
    a pin projecting from said pedestal piece and being received by said fastener, wherein said pedestal piece, said lamp body, and said pin are all formed out of a resin and constitute a unitary injection-molded structure.

2. The lamp mounting apparatus according to claim 1, wherein said pedestal piece is concave at a center portion thereof.

3. The lamp mounting apparatus according to claim 1, wherein said resin is polypropylene.

4. The lamp mounting apparatus according to claim 1, wherein said lamp is a turn signal lamp.

5. The lamp mounting apparatus according to claim 1, wherein said lamp is a headlamp.

6. The lamp mounting apparatus according to claim 1, wherein said lamp is a reversing signal lamp.

7. The lamp mounting apparatus according to claim 1, further comprising stud bolts for firmly fastening the lamp body to the vehicle body.

8. The lamp mounting apparatus according to claim 1 or 7, further comprising a tapping screw for firmly fastening the lamp body to the vehicle body.

9. The lamp mounting apparatus according to claim 1, wherein said pin is press-fitted into said fastener.

10. The lamp mounting apparatus according to claim 1, wherein said pin comprises a small-diameter base and a head integrally formed at an end of said small-diameter base, said head having a barrel-like shape.

11. A lamp mounting apparatus for a vehicular lamp emitting light in a forward direction, comprising:
    a fastener disposed on a vehicle body;
    a pedestal piece formed on a rear surface of a lamp body of the vehicular lamp; and
    a pin protecting from said pedestal piece and being received by said fastener, wherein said pedestal piece comprises:
    a pair of side wall plates opposed to each other;
    a rear plate connecting said side walls plates to each other; and
    a reinforcing rib integrally formed on an outer side surface of each of said side wall plates.

12. The lamp mounting apparatus according to claim 11, wherein the thickness of said side wall plates, said rear surface plate, and said reinforcing ribs is equal to the thickness of the lamp body.

\* \* \* \* \*